United States Patent [19]

Berson et al.

[11] Patent Number: 5,597,504
[45] Date of Patent: Jan. 28, 1997

[54] MICROWAVE REFINING AND MELTING FURNACE

[75] Inventors: Xavier Berson, Jouques; Alain Vivet, Aix en Provence; Eric Bertrand, Manosque, all of France

[73] Assignee: Commissariat a l'Energie Atomique, Paris, France

[21] Appl. No.: 379,570
[22] PCT Filed: Jun. 9, 1994
[86] PCT No.: PCT/FR94/00684
§ 371 Date: Mar. 8, 1995
§ 102(e) Date: Mar. 8, 1995
[87] PCT Pub. No.: WO94/30032
PCT Pub. Date: Dec. 22, 1994

[30] Foreign Application Priority Data

Jun. 11, 1993 [FR] France ............... 93 07056

[51] Int. Cl.⁶ .................................................. H05B 6/80
[52] U.S. Cl. .................. 219/693; 219/687; 219/701; 588/900; 588/247; 110/250
[58] Field of Search ...................... 219/693, 690, 219/687, 701; 588/220, 222, 219, 247, 900; 110/250, 255, 257

[56] References Cited

U.S. PATENT DOCUMENTS

| | | | |
|---|---|---|---|
| 3,611,582 | 10/1971 | Hamid et al. | 219/693 |
| 4,423,303 | 12/1983 | Hirose et al. | 219/693 |
| 4,592,291 | 6/1986 | Sullivan, III | 110/346 |
| 5,082,603 | 1/1992 | Horie et al. | 588/11 |
| 5,188,043 | 2/1993 | Trepaud . | |
| 5,254,818 | 10/1993 | Aubert | 219/693 |

FOREIGN PATENT DOCUMENTS

| | | |
|---|---|---|
| 0499493 | 8/1992 | European Pat. Off. . |
| 62-49295 | 3/1987 | Japan . |

OTHER PUBLICATIONS

Japanese Patents Gazette Week 8714, 03 Mar. 1987, Derwent Publications Ltd., London, GB; AN 87–099306.
Patent Abstracts of Japan, vol. 7, No. 50 (M-197) 26 Feb. 1983 & JP-A-57 198 916 (Nippon Genshiryoku Jibyo KK) 06 Dec. 1982.

Primary Examiner—Philip H. Leung
Attorney, Agent, or Firm—Oblon, Spivak, McClelland, Maier & Neustadt, P.C.

[57] ABSTRACT

A microwave refining and melting furnace for the treatment of dissolved or solid products includes a first waveguide traversed by a microwave beam generated by a generator coupled to a first end of the first waveguide. The first waveguide is provided with a material supply orifice located at an upper part thereof close to a first end of the first waveguide. The first waveguide has at a lower part thereof, close to a second end, an overflow lock of variable height making it possible to define a retention volume for the materials, which have been progressively melted by a continuous flow along the lower wall of the first waveguide, from the reception point thereof in the first guide. A second waveguide is connected to the first waveguide for refining the materials.

14 Claims, 2 Drawing Sheets

MICROWAVE REFINING AND MELTING FURNACE

DESCRIPTION

1. Technical Field

The present invention relates to a microwave refining and melting furnace for the treatment of solid products and dissolved products.

The particular field of the invention is that of the reprocessing of industrial or nuclear waste.

2. Prior Art

French patent application FR-A-2 671 392 describes a microwave melting furnace for the treatment of fluid products such as industrial waste. Said furnace has an upper furnace body, a lower furnace body, means for supplying the products to be treated located in the upper furnace body and a crucible located in the lower furnace body. In order to prevent the crucible from overflowing, said furnace has means for detecting the upper level of the material to be treated and fed into the crucible and a control member for stopping the means for supplying the products to be treated by a detection signal from detection means.

This furnace permits the heat treatment of waste by drying, calcining and melting, but does not make it possible to check the effective obtaining of the melting of the treated waste. Therefore a product may be treated with this apparatus without it being meltable and said apparatus does not behave in a systematic manner like a melting furnace. This configuration does not make it possible to guarantee the complete degassing of the products as a result of the absence of a check on the state of the material.

The apparatus makes it necessary for the operators to work in stages with stoppage of the microwave power. The consequence of such a discontinuous method can be the formation of treated product layers and therefore the production of non-homogeneous and non-monolithic packs. Moreover, this treatment procedure does not permit the refining of products. Finally, the level check in said apparatus does not make it possible to continuously check the filling of the reception member with treated materials.

A publication by C. Shibata and M. Tamai in the journal J1 and entitled "Microwave power and electromagnetic energy", vol. 25, no. 2, 1990 describes a melting furnace, the waveguide of which is inclined at its end, thus forming a constant volume melting vessel. Such a configuration of the guide does not permit the treatment in thin layer form of the product, because the latter is introduced directly into the melting vessel. The design of this inclined furnace also does not permit a continuous, thin layer flow of molten products.

Therefore, this furnace suffers from the same operating disadvantages as the furnace described in FR-A-2 671 392.

Moreover, the movement of material and microwave flows take place in a countercurrent manner, so that the introduced products are not exposed to the high power zone located level with the overflow lock.

However, the energy requirement is very high at the introduction point, because it is at the latter that the drying, calcining and melting operations take place.

Finally, there is always a retention of material within the guide and disassembly is necessary in order to tap the apparatus hold-up.

French patent application FR-A-2 674 939 describes a microwave melting furnace for vitrification and densification of materials. This furnace is equipped with two vertical parts respectively surmounted by a supply means and a wave reflecting buffer. The two vertical parts are connected by a horizontal melting vessel. The materials to be melted and the microwaves are introduced by the first vertical part. The melting vessel has a constant cross-section as a result of a horizontal upper wall in order to assist the microwave power distribution over the surface of the molten bath. The second part can be provided with a piston permitting the regulation of the return of the non-absorbed microwaves.

The design of this melting furnace does not make it possible to refine the molten products by the action of the microwave electromagnetic field. The flowing products undergo thermal quenching because there is no device for the reception and controlled temperature refining of the molten products. Thermal quenching affects the quality of the end product (bursting of the molten products, impossibility of recrystallizing them). The vertical parts giving the waveguide a curved U or J configuration are equipped with double cooled envelopes, so that on treating waste rich in volatile elements (generally chlorides contained in majority form in industrial waste), said elements vaporized in the furnace during the treatment crystallize on the cold walls of the furnace. Thus, there is a solid retention, which affects the satisfactory operation of the furnace by modifying the tuning of the standing wave and by blocking the gas outlet orifices. The furnace is supplied by means of an orifice located on one of the upper parts of the waveguide. Such an arrangement involves material travel in a vertical part of the waveguide, so that the tuning of the standing wave is constantly modified by material transfer. The distance covered by the material exceeds the wavelength of the electromagnetic radiation, so that the microwave generator malfunctions.

Pouring of the molten materials takes place through a sufficiently wide orifice to permit the action of the microwaves on the materials flowing therefrom. This leads to a microwave leak outside the waveguide, thus prejudicing safety around the installation. This does not prevent the thermal quenching of the molten products.

Moreover, the permanent retention of a volume of materials in the lower part of the furnace can be disadvantageous in the case of the treatment of radioactive waste, which thus constitute a source of harmful radiation.

DISCLOSURE OF THE INVENTION

The present invention aims at solving the problems existing in the prior art, while permitting the refining of the molten products.

It therefore proposes a microwave melting and refining furnace for the treatment of dissolved or solid products, comprising a waveguide, inclined with respect to the horizontal and traversed by a microwave beam generated by a generator coupled to a first end of the guide, said waveguide having in its upper part close to its first end and in front of the lower, downwardly inclined wall, a supply orifice for materials, characterized in that said guide has in its lower part close to the second end, a variable height overflow lock making it possible to define a retention volume for materials which have progressively melted by a continuous flow along the lower wall of the guide from the reception point thereof in said guide.

The flow of materials and the microwave flux take place in the same direction within the waveguide, which leads to maximum furnace efficiency.

This design of the waveguide makes it possible to continuously perform the drying, calcining, melting and then refining operations on solid and liquid waste by means of a waveguide having an original design and connected to a single microwave source.

This design of the furnace makes it possible to guarantee the formation of a liquid phase corresponding to the melting of the waste by putting into place, in the waveguide, a melting chamber, whose retention volume can vary.

Advantageously, the guide is provided in its upper part close to its second end with a chimney or stack for the extraction of vapors and gases and in its lower part with a cooling circuit so as to prevent internal corrosion of the wall of the guide under the action of the molten products.

Advantageously, the lower part of the guide positioned downstream of the overflow lock is shaped like a bend or elbow making it possible to bring the axis of the waveguide into the vertical position.

The melting furnace advantageously has a second waveguide joined to the first by tight fitting and making it possible to refine the molten materials. This fitting takes place with the aid of a flange. This second waveguide is formed by a reception and refining container for the molten products constituting the terminal part of the furnace containing a refractory crucible. A cooling circuit is placed around said second waveguide.

Thus, the melting furnace according to the invention makes it possible to continuously produce monolithic, refined glass or glass ceramic blocks by putting into place a reception and refining container for the molten products constituting the end of the waveguide.

In a system for the recovery of products in a furnace like that described hereinbefore, the reception container is brought into contact with the lower part of the first element of the furnace by means of a flange, whose two parts are perfectly flat and whose fitting permits an adequate tightness to prevent microwave leaks, the contact of the two elements of the flange taking place by means of a spring exerting a vertical, upwardly oriented force and placed beneath the refining container, the exerted force exceeding the sum of the weight of the empty refining container and that of the molten products filling the container and the force necessary for obtaining the sealing at the flange, a jack making it possible to compress the spring in order to free the reception container and permit the replacement thereof after it has been filled. The force exerted by the spring is read by a reading device connected to a force transducer placed between the spring and the reception container so as to permanently check the filling of the latter.

Such a system makes it possible to continuously check the filling level of the container receiving the melting products by means of force transducers.

DETAILED DESCRIPTION OF EMBODIMENTS

The invention relates to a microwave melting and refining furnace permitting the continuous or discontinuous treatment of dissolved mineral products or pulverulent solid products. These products can e.g. be industrial or nuclear waste.

Figure 1:
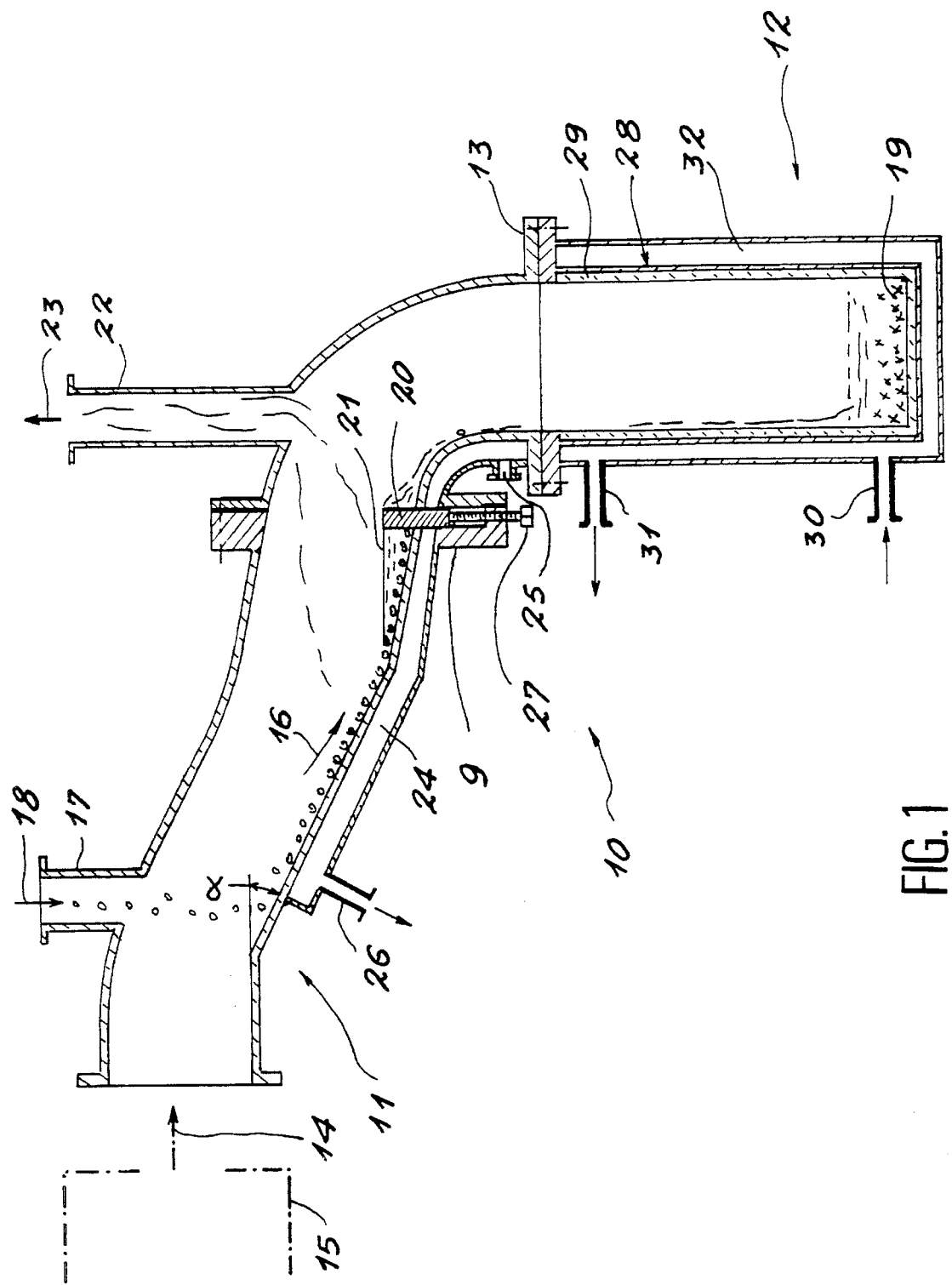
FIG. 1 illustrates a microwave melting and refining furnace according to the invention.
Figure 2:
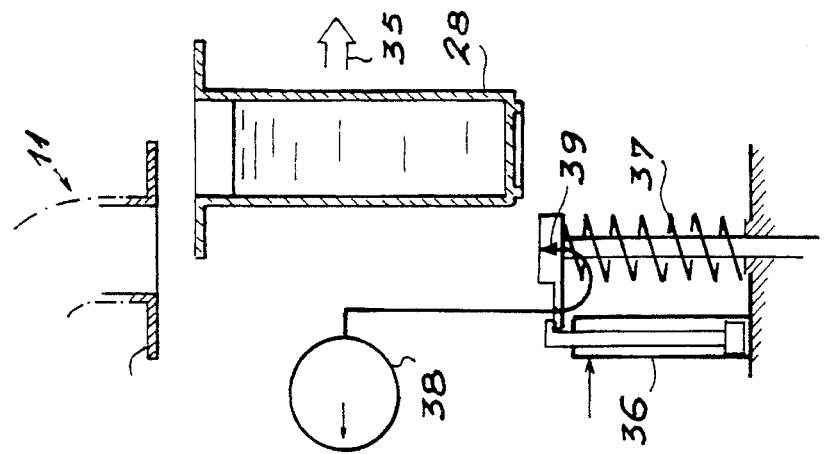
FIGS. 2A–2D illustrate different stages of operation of a system for the recovery of products in the furnace according to the invention, as shown in FIG. 1.
Figure 2:
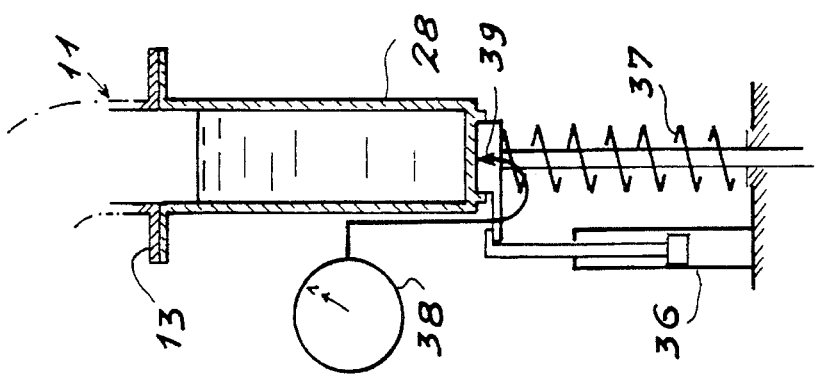
Figure 2:
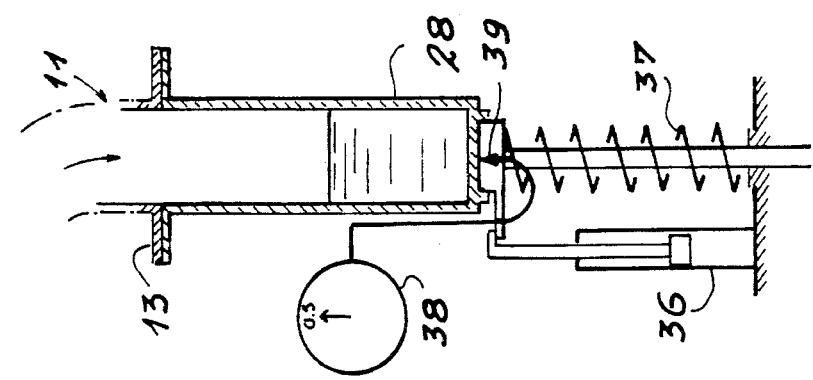
Figure 2:
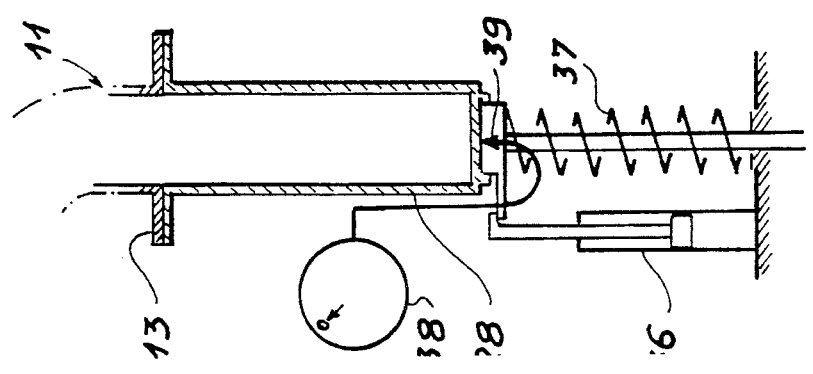

As shown in FIG. 1 the furnace 10 comprises two waveguide elements 11, 12 joined by a tight flange 13. Each element is traversed by a microwave beam 14 generated by a microwave generator 15 positioned upstream of the furnace. Each element 11, 12 has a different design and can therefore perform the operations allocated thereto.

The first element 11 of the melting furnace 10 is constituted by an inclined waveguide having a uniform or non-uniform slope forming an angle $\alpha$ preferably between 10° and 45° to the horizontal. The upper part of the guide is equipped with a supply nozzle or orifice 17 by means of which introduction takes place into the first element of the furnace of the product 18 to be treated, e.g. using an Archimedean screw in the case of a solid product or a pump in the case of a liquid. The section of said waveguide can be rectangular, square or round. The product introduced by gravity into this element of the furnace traverses the section of the waveguide.

This type of supply makes it possible to prevent any blockage of the supply caused by the drying or calcining of products.

Travel of the material by a continuous flow along the sloping lower wall of the guide from the point of reception of the products in the guide does not disturb the tuning of the incident wave in view of the small transfer distance. The continuously or discontinuously introduced product undergoes heating, appropriate for its dielectric characteristics, as a result of alternate rotations of its molecules under the effect of the magnetic wave of the microwave beam.

As a function of the characteristics of the product, its heating causes its drying if it is wet, its possible calcining and its melting.

The inclination of the waveguide in which is received the treated product permits a continuous flow 16 of the progressively melted products from the reception point to a retention volume 21 due to an overflow lock 20 having a height regularable by means of a screw 27 and which is positioned close to the end of the first element 11 of the furnace by means of a flange 9. The flow on the inclined plane makes it possible to perform a continuous, progressive thin layer melting optimizing the absorption of the microwave beams and ensuring a complete degassing of the combustion products. When the molten product reaches the overflow lock 20, it has undergone all the transformations linked with the exposure to microwave radiation. The retention volume 21 is defined by the height of the overflow lock.

For a fixed energy quantity, the variation of the retention volume 21 of the molten products and therefore the free surface thereof makes it possible to regulate the energy quantity intended for refining. This energy quantity corresponds to the energy not absorbed by the molten product present in the retention means of the first element of the furnace. The non-absorbed energy is directed to the second element of the melting furnace.

The elbow or bend-shaped lower end bringing the axis of said waveguide into the vertical position is equipped on the upper wall with a chimney or stack 22 permitting the extraction of the vapors and gases 23.

Between the reception of the products and the connection flange to the second element, the lower wall of said first inclined element has a cooling circuit 24 preventing internal corrosion of said wall under the action of the molten products. This circuit 24 has an inlet 25 and an outlet 26 for pressurized cooling liquid.

The second element 12 of the melting furnace is constituted by a waveguide formed by a reception and refining container 28 for the melting products constituting the terminal part of the furnace. This reception container can optionally contain a refractory crucible 29. A cooling circuit 32 having an inlet 30 and an outlet 31 for the cooling liquid is placed around said container 28.

The function of said second element is to receive the molten products flowing by gravity in order to refine them at a varying speed as a function of the viscosity of the products and thus avoid the presence of microbubbles. It also makes it possible to transform the amorphous structure of the products into a crystalline structure by adding nucleating agents.

This refining consists of maintaining the product in the liquid state after melting and then progressively cooling the same. This operation is performed by microwave energy not absorbed in the first element of the furnace. The continuous flow of material received in the container terminating the furnace defines the product refining time. Refining takes place gradually in thin layer form.

The interest taken in such refining is due to the fact that it makes it possible to valorize the microwave energy not absorbed during the drying—calcining—melting stage.

As a function of the products treated, this stage also makes it possible to produce glass or glass ceramic monoliths 19. As these monoliths have not undergone any thermal quenching, their physical qualities are superior to those of suddenly cooled products.

Different types of waste have been treated by melting using the microwave furnace according to the invention. Three different examples of the thus treated waste will now be considered.

WASTE NO. 1

This consisted of neutralized fly ash obtained from a domestic waste incinerator and having the following chemical composition in % by weight:

| | | | |
|---|---|---|---|
| $Na_2B_4O_7$ | 20% | $CaCO_3$ | 3.04% |
| $CaCl_2$ | 21.6% | $CaSO4$ | 5.68% |
| $NaCl$ | 5.28% | $Ca(OH)_2$ | 2.16% |
| $Kcl$ | 11.12% | $Fe_2O_3$ | 0.88% |
| $Al_2O_3$ | 8.48% | $H_2O$ | 2.80% |
| $SiO_2$ | 13.68% | $ZrO_2$ | 1.12% |
| | other oxides | | |
| | 4.16% | | |

This waste underwent a continuous melting at a temperature of 1050° C. After treatment 80% by weight of the waste has been densified by a factor of 6.4.

WASTE NO. 2

This waste is constituted by simulated ash resulting from the incineration of waste obtained in the nuclear technology field. The following elements are obtained in weight percentages:

| | | | |
|---|---|---|---|
| $Na_2B_4O_7$ | 30% | $Fe_2O_3$ | 0.79% |
| | | $MgO$ | 0.65% |
| $Al_2O_3$ | 36.12% | $TO_2$ | 0.40% |
| $SiO_2$ | 14.5% | $ZnO$ | 2.48% |
| $BaO$ | 0.31% | $Na_2O$ | 5.95% |
| $CaO$ | 6.86% | $ZrO_2$ | 0.27% |

This waste was treated at a flowrate of 3 kg/h under an incident power of 5 kW/H (in the generator). The discharges of molten products are obtained for viscosities below 200 poises and a temperature of 1100° C.

WASTE NO. 3

This results from rendering insoluble heavy metals. It is constituted by a chemical mud having the following solid elements:

| | | | |
|---|---|---|---|
| $BaSO_4$ | 29.4% | Diatom | 1.2% |
| $Fe(CN)Ni$ | 6.4% | $NaNO_3$ | 15.6% |
| $CoS$ | 4.2% | $NaKSO_4$ | 1.2% |
| $H_3BO_3$ | 24% | | |

Continuous melting is obtained by microwave heating at 1300° C.

FIGS. 2A, 2B, 2C and 2D represent a system for the recovery of melted products in which the reception container 28 for the melted products is joined by tight fitting to the lower part of the first element 11 of the furnace 10. After filling, the reception container 28 is replaced (35) by another container using a not shown means, but in manner known to the expert. Such a system permits a continuous check of the level of the molten products.

The reception container 28 is brought into contact with the lower part of the first element 11 of the furnace 10 by means of the flange 13, whose two parts are perfectly flat and whose fitting permits an adequate seal to avoid microwave leaks. The contact of the two elements of the flange takes place by means of a spring 37 exerting an upwardly oriented vertical force placed beneath the refining container.

The force exerted exceeds the sum of the weight of the empty refining container and that of the melting products filling the container and the force necessary for obtaining the seal at the flange. A jack 36 makes it possible to compress the spring in order to release the reception container and permit the replacement thereof.

In the normal operation configuration, the force exerted by the spring is read by a reading device 38 connected to a force transducer 39 placed beneath the spring or beneath the lower part of the contact flange.

The force transducer initially measures the total force applied to the empty assembly. This is followed by a calibration and then checking takes place during filling of the reduction of the component:force applied by the spring/weight of the assembly. This evolution is proportional to the weight of the molten product. It is thus possible to permanently check the filling of the refining container.

We claim:

1. Microwave melting and refining furnace for the treatment of dissolved or solid products, comprising: a first waveguide inclined with respect to horizontal and traversed by microwave beams generated by a generator coupled to a first end of the guide, said first waveguide having in an upper part thereof in proximity with a first end and in front of a lower, downwardly inclined wall of the first waveguide, a supply orifice supplying materials to said upper part such that said first waveguide initially performs drying, calcining and melting of said materials wherein said first waveguide has in a lower part thereof in proximity to a second end thereof a variable height overflow lock retaining a retention volume for said materials receiving the microwave beams and which have been progressively melted by a continuous flow of the melted material along the lower wall of the first waveguide from the first end of said first waveguide, and a second waveguide located downstream of the first waveguide, said second waveguide refining the melted materials.

2. Furnace according to claim 1, wherein, at an upper part in proximity with the second end of the first waveguide, a vapor and gas extraction chimney is located.

3. Furnace according to claim 1, wherein in the lower part the first waveguide a cooling circuit is located, said cooling circuit preventing internal corrosion of the wall of the first waveguide under the action of the melted products.

4. Furnace according to claim 1, wherein the first waveguide has one of a uniform and non-uniform slope.

5. Furnace according to claim 1, wherein the lower part of the first waveguide is positioned downstream of the overflow lock and comprises a bend so as to bring an axis of the waveguide into the vertical position.

6. Furnace according to claim 1, wherein the second waveguide is joined to the first by a tight fitting permitting refining of the molten material in the second waveguide.

7. Furnace according to claim 6, wherein said fitting comprises a flange.

8. Furnace according to claim 6, wherein said second waveguide comprises a reception and refining container containing the melted materials and forming a terminal part of the furnace.

9. Furnace according to claim 8, wherein said reception container contains a refractory crucible.

10. Furnace according to claim 8, wherein in the lower part of the first waveguide a cooling circuit is located and a portion of said cooling circuit is arranged around said second waveguide.

11. System for the recovery of products in a furnace comprising:

a first waveguide, inclined with respect to horizontal and traversed by microwave beams generated by a generator coupled to a first end of the first waveguide, said first waveguide having in an upper part thereof in proximity with a first end thereof, in front of a lower, downwardly inclined wall of the first waveguide, a supply orifice supplying materials to said upper part such that said waveguide initially performs drying, calcining and melting of said materials, wherein said first waveguide has in a lower part thereof, in proximity with a second thereof, a variable height overflow lock retaining a retention volume for said materials receiving the microwave beams and which have been progressively melted by a continuous flow of the melted material along the lower wall of the first waveguide from the first end said first waveguide, and a second waveguide located downstream of the first waveguide wherein the second waveguide includes a reception and refining container refining the melted materials, wherein the reception container is brought into contact with the lower part of the first element of the furnace by a flange to prevent microwave leaks, a spring is located beneath the refining container exerting an upwardly oriented vertical force on the refining container, the force exerted by the spring exceeding a sum of the weight of the refining container when empty, the weight of the melted products filling the container and a force necessary to obtain a seal at the flange, and a jack compressing the spring so as to release the reception container and permit replacement thereof after the reception container has been filled.

12. System according to claim 11, which comprises a reading device connected to a force transducer positioned between the spring and the reception container and checking filling of the reception container.

13. A system as claimed in claim 11, wherein said reception container contains a refractory crucible.

14. A system as claimed in claim 11, wherein in the lower part of the first waveguide a cooling circuit is located and a portion of said cooling circuit is arranged around said second waveguide.

* * * * *